United States Patent
Lee

(10) Patent No.: US 10,444,768 B2
(45) Date of Patent: Oct. 15, 2019

(54) FLOW-CONTROLLING UNIT PROVIDED IN FLOW CHANNEL

(71) Applicant: Jang Woo Lee, Gyeonggi-do (KR)

(72) Inventor: Jang Woo Lee, Gyeonggi-do (KR)

( * ) Notice: Subject to any disclaimer, the term of this patent is extended or adjusted under 35 U.S.C. 154(b) by 215 days.

(21) Appl. No.: 15/123,092

(22) PCT Filed: Mar. 5, 2015

(86) PCT No.: PCT/KR2015/002120
§ 371 (c)(1),
(2) Date: Sep. 1, 2016

(87) PCT Pub. No.: WO2015/133833
PCT Pub. Date: Sep. 11, 2015

(65) Prior Publication Data
US 2017/0068255 A1    Mar. 9, 2017

(30) Foreign Application Priority Data

Mar. 5, 2014  (KR) .................. 10-2014-0026198
Mar. 5, 2014  (KR) .................. 10-2014-0026201
Mar. 5, 2014  (KR) .................. 10-2014-0026206

(51) Int. Cl.
*G05D 7/01*     (2006.01)
*E03C 1/08*     (2006.01)
(Continued)

(52) U.S. Cl.
CPC .......... *G05D 7/0173* (2013.01); *E03C 1/025* (2013.01); *E03C 1/0404* (2013.01); *E03C 1/08* (2013.01);
(Continued)

(58) Field of Classification Search
CPC .......... Y10T 137/784; Y10T 137/7843; Y10T 137/7875; Y10T 137/7838;
(Continued)

(56) References Cited

U.S. PATENT DOCUMENTS 249,557 A * 11/1881 Truesdell ............... F16K 15/16
                                                    137/855
1,701,277 A * 2/1929 Shindel .................. F16K 15/16
                                                    128/207.12
(Continued)

FOREIGN PATENT DOCUMENTS

JP          S 56151565 U     11/1981
JP          S59-11236 Y2      4/1984
(Continued)

OTHER PUBLICATIONS

Int'l Search Report dated Jun. 12, 2015 in Int'l Application No. PCT/KR2015/002120.

*Primary Examiner* — Marina A Tietjen
*Assistant Examiner* — Frederick D Soski
(74) *Attorney, Agent, or Firm* — Panitch Schwarze Belisario & Nadel LLP

(57) ABSTRACT

A flow-controlling unit provided in a flow channel is disclosed. The flow-controlling unit provided in a flow channel, according to one embodiment of the present invention, comprises: a plate which is disposed perpendicular to the moving direction of a fluid in a flow channel, and on which are formed multiple fluid through-holes through, which the fluid passes; and one or more flow-controlling pieces which are provided in a position corresponding to the fluid through-holes, form an inclination with respect to the plate in the direction of the inflow of the fluid, are capable of tilting on the plate, and control the degree of opening of the fluid through-holes by being tilted due to pressure applied from hydraulic pressure of the fluid.

7 Claims, 14 Drawing Sheets

(51) Int. Cl.
   *E03C 1/02* (2006.01)
   *E03C 1/04* (2006.01)
   *F16K 15/14* (2006.01)

(52) U.S. Cl.
   CPC ...... *F16K 15/144* (2013.01); *E03C 2001/026* (2013.01); *Y10T 137/784* (2015.04); *Y10T 137/7843* (2015.04); *Y10T 137/7875* (2015.04)

(58) Field of Classification Search
   CPC ........ Y10T 137/7839; Y10T 137/7842; G05D 7/0173; E03C 1/025; E03C 1/0404; E03C 1/08; E03C 2001/026; F16K 15/44
   See application file for complete search history.

(56) References Cited

U.S. PATENT DOCUMENTS

| | | | | |
|---|---|---|---|---|
| 1,783,599 A | * | 12/1930 | Blake | F16F 9/22 137/512.1 |
| 2,217,380 A | * | 10/1940 | Longenecker | F16K 15/16 137/517 |
| 2,864,394 A | * | 12/1958 | Hempel | A01G 25/16 137/517 |
| 2,899,981 A | * | 8/1959 | Binks | F16L 55/04 137/855 |
| 4,141,380 A | * | 2/1979 | Lenk | G05D 7/0173 137/513.5 |
| 8,167,002 B2 | * | 5/2012 | Kuhne | G05D 7/012 137/504 |

FOREIGN PATENT DOCUMENTS

| | | |
|---|---|---|
| JP | H-04219575 A | 8/1992 |
| JP | H-06288480 A | 10/1994 |
| JP | 3026026 B2 | 3/2000 |
| KR | 20000020640 U | 12/2000 |

\* cited by examiner

FLOW-CONTROLLING UNIT PROVIDED IN FLOW CHANNEL

CROSS-REFERENCE TO RELATED APPLICATION

This application is a Section 371 of International Application No. PCT/KR2015/002120, filed Mar. 5, 2015, which was published in the Korean language on Sep. 11, 2015, under International Publication No. WO 2015/133833 A1, and the disclosure of which is incorporated herein by reference.

BACKGROUND ART

Typically, a discharge amount of tap water used in each, home varies depending on an installed position, of a faucet device, even when using the water pipes of the same size, and the water pressure and the discharge amount flowing through the water pipe vary due to an installed position of a water tank and a difference in interval between the water tank and each faucet device. Further, in the case of an aging water pipe, the discharge amount varies with foreign matter such as an internal scale or the like.

Since the aforementioned water pressure is proportional to the dimension of the water pipe and the amount of water that can be discharged within a limited time, in a faucet device with a weak water pressure of the water pipe, a small amount of water is discharged within in the same amount of time, and meanwhile, in the faucet device with a string water pressure, a relatively lot of the amount of water is discharged.

Accordingly, the high-rise buildings and the low-rise of the high-rise apartments have a problem that it should accept a loss generated by the waste of some of the discharge; amount due to the water pressure more than necessary.

In consideration of such a problem, a flow control device which measures the water pressure of the water pipe and reduces the cross-sectional area of the water pipe so as to match the reference value has been attached and used. Thus, since the flow rate is controlled by controlling the area, regardless of the internal water pressure of the water pipe, many types of required flow control devices need to be manufactured depending on the dimension and the water pressure of the water pipe, and since a specific flow control device is mounted after visiting each house to measure the dimension of the water pipe, the water pressure and the discharge amount and after disassembling the valve, there is a problem in that a lot of labor and time for mounting the flow control device are taken.

DISCLOSURE

Technical Problem

The present invention has been made to solve the conventional problems described above, and an object of the present invention is as follows.

First, the present invention is to provide a flow-controlling unit provided, on the flow channel which is capable of preventing the fluid from being wasted by excessive strong water pressure, since the constant flow rate of the discharged fluid is maintained at all times.

Second, the present invention is to provide a flow-controlling unit provided on the flow channel which is capable of maintaining a constant flow rate with a very simple structure.

The objects of the present, invention are not limited to the aforementioned objects, and other objects that have not been mentioned will be clearly understood by those skilled in the art from the following description.

Technical Solution

According to an aspect of the present invention, there is provided a flow-controlling unit provided on a flow channel that may include a plate, and a plurality of flow-controlling pieces.

The plate is disposed to foe perpendicular to a movement direction of the fluid on a flow channel, and a plurality of fluid through-holes through which the fluid passes are formed in the plate.

The flow-controlling pieces are provided at a position corresponding to the fluid through-holes, form an inclination with the plate in the direction of the inflow of the fluid, are capable of tilting with respect to the plate, and control the degree of opening of the fluid through-holes by being tilted while being pressed by hydraulic pressure of the fluid.

The flow-controlling pieces may form the fluid through-holes, by partially cut from the plate and by being bent to the inflow side of the fluid to form the inclination with the plate.

The flow-control ling pieces may be coupled to the plate as separate members.

The dimension of the flow-controlling pieces may be formed to be larger than the dimension of the fluid through-holes to limit the tilting angle of the flow-controlling pieces.

A bypass flow channel configured to block the flow of the fluid may be formed in the center of the plate, When a plurality of fluid through-holes and a plurality of flow-controlling pieces are formed, the plurality of fluid through-holes and the plurality of flow-controlling pieces may be disposed on a concentric circle around the center of the plate.

When the plurality of fluid through-holes and the plurality of flow-controlling pieces are formed, both of the fluid through-holes and the flow-controlling pieces may form the same inclination.

The flow-controlling pieces may have an elastic force and a restoring force so that it can foe restored to its original state, when the hydraulic pressure is removed.

When the plurality of fluid through-holes and the plurality of flow-control ling pieces are formed, at least two of the flow-controlling pieces may be formed such that projected areas on which the hydraulic pressure acts are different from each other, and by being tilted while being pressed due to the hydraulic pressure of the fluid, the degrees of opening of the plurality of fluid through-holes may be sequentially narrowed in accordance with the areas of the flow-controlling pieces.

The flow-controlling pieces facing each other may have the same area.

One of the plurality of fluid through-holes and one of the plurality of flow-controlling pieces may be formed in a central part of the plate.

Alternatively, when the plurality of fluid through-holes and the plurality of flow-controlling pieces are formed, the inclinations of at least two of the flow-controlling pieces with the plate are formed to be different from each other, and by being tilted while being pressed due to the hydraulic pressure of the fluid, the degrees of opening of the plurality of fluid through-holes may be sequentially narrowed in accordance with the inclinations of the flow-controlling pieces.

Among the plurality of fluid through-holes, the inclinations of the flow-controlling pieces facing each other formed with the plate may be the same.

A stopper configured to limit the tilting angle of the flow-controlling pieces may be provided at the rear of the plate.

Advantageous Effects

Effects of the present invention configured as described above are as follows.

First, according to the flow-controlling unit provided on the flow channel according to an embodiment of the present invention, the inclination formed between the flow-controlling pieces and the plate changes by the hydraulic pressure, and by controlling the degree of opening of the flow channel accordingly, the constant flow rate of the fluid can be maintained.

Second, according to the flow-controlling unit provided on the flow channel according to an embodiment of the present invention, since the flow rate of the fluid is maintained constant at all times, a water saving effect can be expected.

Third, according to the flow-controlling unit provided on the flow channel according to an embodiment of the present invention, the flow-controlling pieces are formed by cutting and bending the plate, the flow rate can be kept constant with a very simple structure.

The effects of the present invention are not limited to the above-mentioned effects, and other effects that have not been mentioned will be clearly understood from the scope of the claims to those skilled in the art.

DESCRIPTION OF DRAWINGS

The detailed description of the preferred embodiments of the present application to be described below, and the aforementioned summary will be able to understand better than when read in conjunction with the accompanying drawings. The preferred embodiments are illustrated in the drawings for the purpose of illustrating the present invention. However, it should be understood that the present application is not limited to the illustrated precise arrangements and means.

BEST MODE

Figure 1:
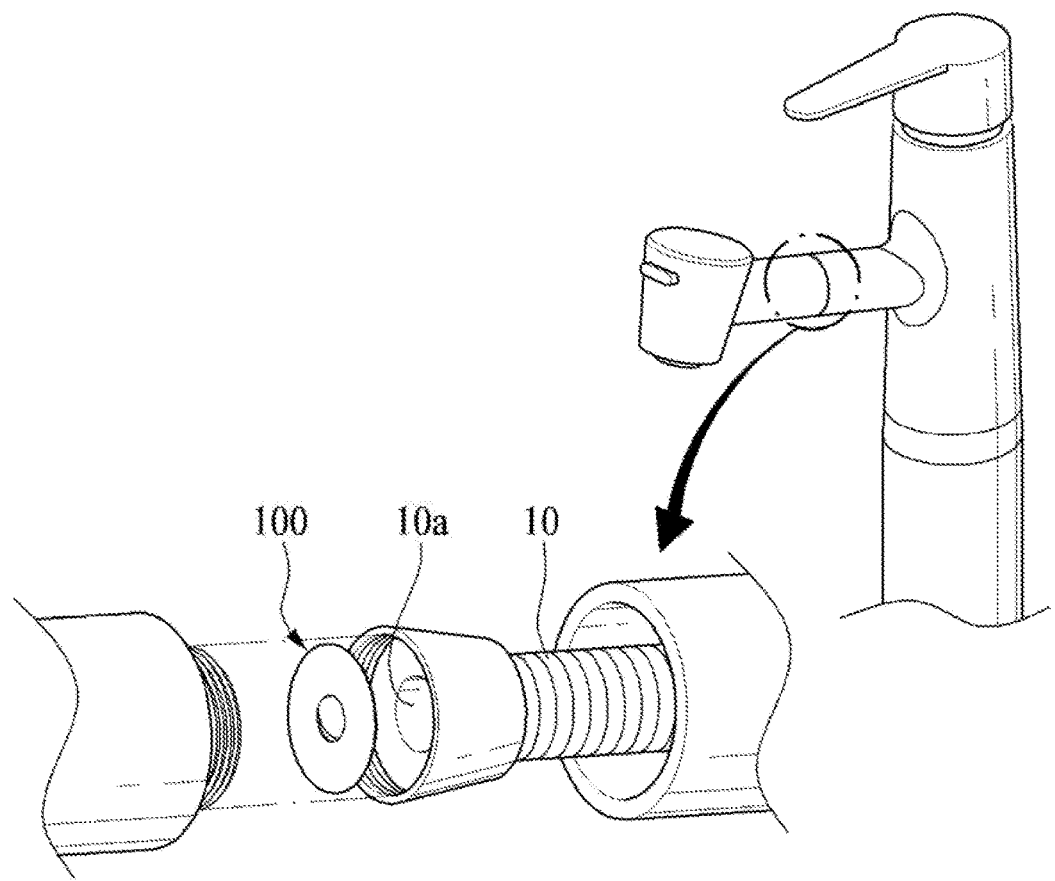
FIG. 1 is a diagram illustrating an aspect in which a flow-controlling unit provided on a flow channel according to an embodiment of the present invention is installed in an internal flow channel of a water supply device.

Hereinafter, embodiments of the invention will be described in detail with reference to the accompanying drawings. The drawings are attached hereto to help explain exemplary embodiments of the invention, and the present invention is not limited to the drawings and embodiments. In the drawings, some elements may be exaggerated, reduced in size, or emitted for clarity or conciseness.

Further, in describing the embodiments of the present invention, it is previously stated that components having the same function are simply denoted by the same names and the same reference numerals, and are not substantially exactly the same as the components of the prior art.

Further, terms used in this application are simply used for the purpose of describing the particular embodiments and are not intended to limit the present invention. Singular expressions include plural expressions, unless they are meant in a clearly different manner in the context. In this application, terms such as "includes" or "has" should be understood to specify the presence of features, numbers, steps, operations, constituent elements, components or a combination thereof described in the specification, rather than excluding the presence or additional possibility of one or other features, numbers, steps, operations, constituent elements, components or a combination thereof in advance.

FIG. 1 is a diagram illustrating a configuration in which a flow-controlling unit provided on a flow channel according to an embodiment of the present invention is installed in an internal flow channel of the water supply device.

As illustrated in FIG. 1, the flow-controlling unit provided on the flow channel according to an embodiment of the present invention may be installed on a flow channel 10a. Although FIG. 1 illustrates an example in which the flow channel 10a is the flow channel 10a of the water supply device 10, the invention is not limited thereto, and as long as it allows the fluid to flow, the flow channel can be applied to any location.

Figure 2:
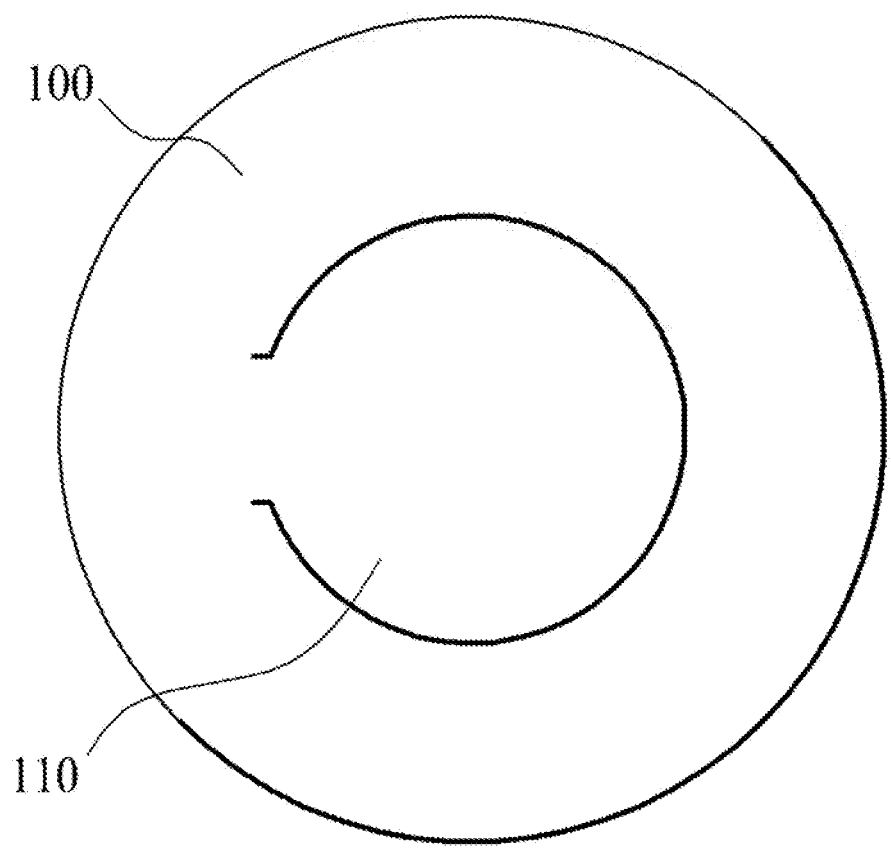
FIG. 2 is a plan view of the flow-controlling unit provided on the flow channel according to an embodiment of the present invention.
Figure 3:
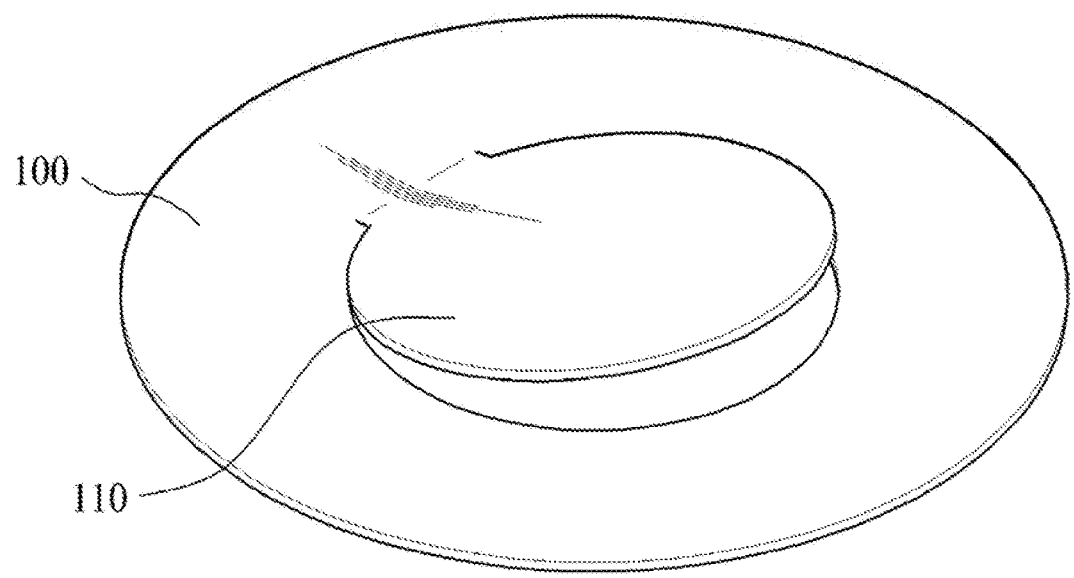
FIG. 3 is a perspective view of the flow-controlling unit provided on the flow channel according to an embodiment of the present invention.
Figure 4:
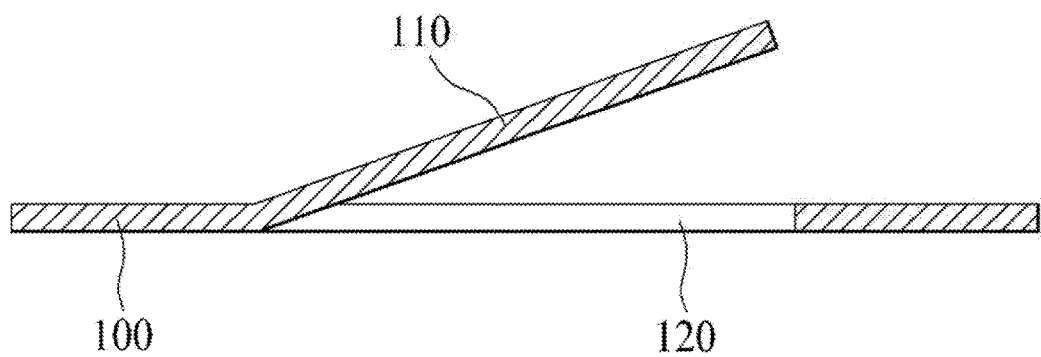
FIG. 4 is a cross-sectional view of the flow-controlling unit provided on the flow channel according to an embodiment of the present invention.

FIG. 2 is a plan view of the flow-controlling unit provided on the flow channel according to an embodiment of the present invention, FIG. 3 is a perspective view of the flow-controlling unit provided on the flow channel according to an embodiment of the present, invention, and FIG. 4 is a cross-sectional view of the flow-controlling unit provided on the flow channel according to an embodiment of the present invention.

Hereinafter, the flow-controlling unit provided on the flow channel according to an embodiment of the present invention will be described with reference to FIGS. 2 through 4.

As illustrated in FIGS. 2 to 4, the flow-controlling unit provided on the flow channel according to an embodiment of the present invention may include a plate 100 and a flow-controlling piece 110.

The plate 100 can be located in the flow channel 10a perpendicularly to the flow direction of the fluid. The plate 100 can be with one or more fluid through-holes 120 through which the fluid passes.

Here, the fluid is used in the meaning of including both of liquid such as water and oil, and gas such as air and oxygen, without being limited to water.

The plate 100 may be formed in a circular shape, and may have a predetermined thickness. The thickness of the plate 100 can be determined in consideration of the hydraulic pressure of the fluid flowing through the fluid channel to which the plate 100 is applied, the cross-sectional area, of the flow channel and the like. The thickness of the plate 100 applied to the flow channel of the strong hydraulic pressure can be channel can be thickly formed.

Further, as the material of the plate 100, a metal or synthetic resin having corrosion resistance can be applied, but is not limited thereto.

The flow-controlling piece 110 is tiltably provided to the plate 100 by forming a inclination with the plate 100 in a direction in which the fluid flows, and is tilted under pressure by the hydraulic pressure of the fluid, thereby making it possible to control the degree of opening of the fluid through-hole 120. Thus, the variation width of the flow rate is narrowed, and thus, the water-saving effect can be expected.

For example, when the flow rate of the fluid flowing through the flow channel 10a increases and the flow velocity becomes higher, the pressure of pressurizing the flow-controlling piece 110 increases. Thus, the flow-controlling piece 110 is tilted in the flowing direction of the fluid by the large angle, and the degree of opening between the flow flow-controlling piece 110 and the plate 100 can be narrowed. Thus, the flow rate passing through the fluid through-hole 120 decreases, and as a result, the flow rate discharged to the outside may decrease as compared to the flow rate flowing in the flow channel 10a.

Alternatively, when the flow rate of the fluid flowing through the flow channel 10a decreases and the fluid velocity is lowered, the pressure of pressurizing the flow-controlling piece 110 by the fluid is relatively lowered. Thus, the flow-controlling piece 110 is tilted in the flowing direction of the fluid by the relatively small angle, and the fluid through-hole 120 between the fluid flow-controlling piece 110 and the plate 100 may be widened as compared to the aforementioned case. Accordingly, the flow rate passing through the flow through-hole 120 increases, and as a result, the flow rate discharged to the outside through the faucet device may relatively increase.

By the aforementioned principle, the variation width of the flow rate to be discharged to the outside through the faucet device is narrowed, thereby obtaining a water-saving effect.

In an embodiment of the present invention, the flow-controlling piece 110 can form the fluid through-hole 120, by being partially cut from the plate 100 and bent to the inflow side of the fluid to form an inclination with the plate 100. That is, the plate 100 and the flow-controlling piece 110 may be formed integrally. Thus, it is possible to obtain the water saving effect with minimal constituent elements.

When the plate 100 and the flow-controlling piece 110 are formed integrally as in this embodiment the material of the plate 100 is a material having an elastic force and restoring force, and the flow-controlling piece 110 is pressurized toy the hydraulic pressure of the fluid, when the inclination with the plate 100 decreases and then the hydraulic pressure is removed, the inclination with the plate 100 increases again, and the flow-controlling piece 110 can be restored to the original state.

Figure 5:
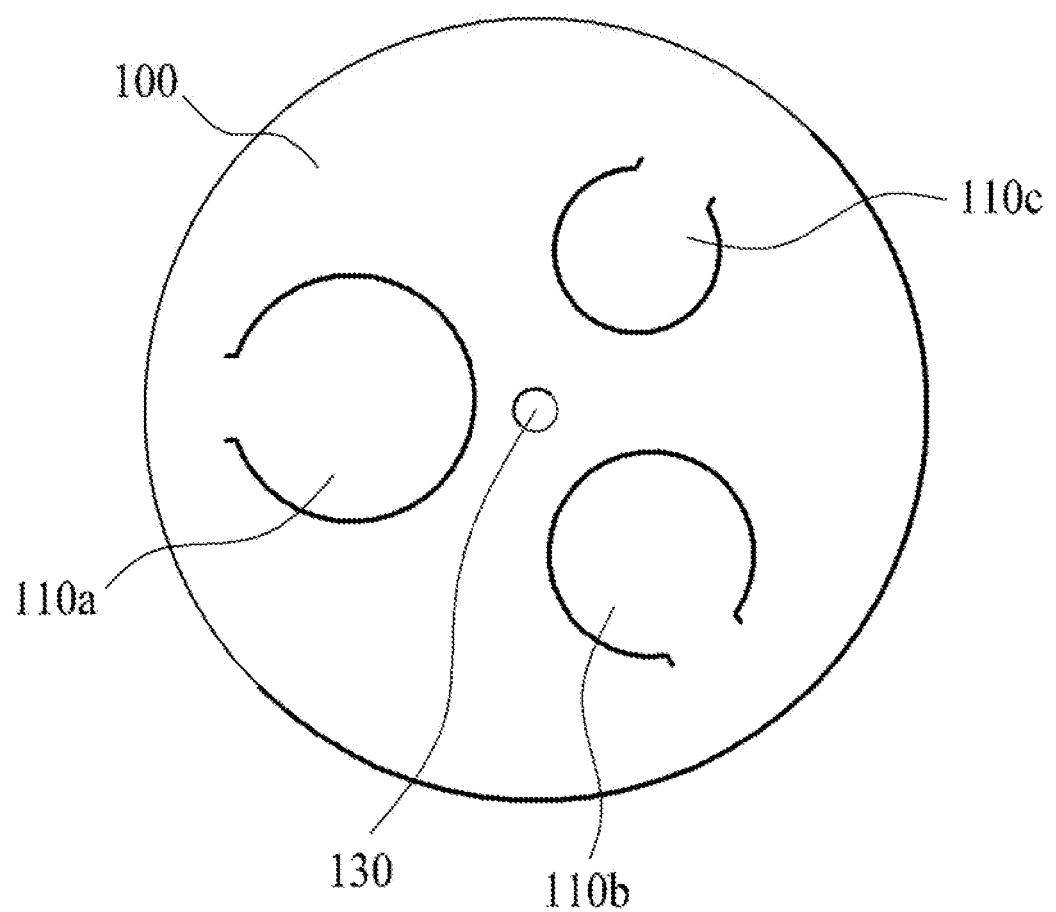
FIG. 5 is a diagram illustrating a configuration in which a plurality of flow through-holes and flow-controlling pieces are formed in the plate Of the flow-controlling unit provided on the flow channel according to an embodiment of the present invention.

FIG. 5 is a diagram illustrating a configuration in which a plurality of flow through-holes and flow-controlling pieces are formed in the plate of the flow-controlling unit provided on the flow channel according to an embodiment of the present invention.

Only a single fluid through-hole 120 may also be formed as illustrated in FIGS. 2 to 4, and a plurality of fluid through-holes 120 may be formed as illustrated in FIG. 5. Further, the flow-controlling pieces 110 are installed by the same number as the fluid through-holes 120, each flow-controlling piece 110 may correspond to each fluid through-hole 120, and a plurality of flow-controlling pieces 110 may correspond to the single fluid through-hole 120.

While the drawing of the present embodiment illustrates an example in which the dimension of the flow-controlling piece 110 correspond to the dimension of the fluid through-hole 120, the dimension of the flow-controlling piece 110 may also be formed to be smaller than the dimension of the fluid through-hole 120.

Further, the sizes of all the flow-controlling pieces 110 may be differently formed as illustrated in FIG. 5. Accordingly, since the areas to which the hydraulic fluid of the flow flowing through the flow channel 10a is applied are different from each other, each of the flow-controlling pieces 110 can be inclined by the different inclinations from each other.

The drawing of the present embodiment illustrate an example in which the three fluid through-holes 120 and the three flow-controlling pieces 110 are formed, for convenience of explanation, the largest flow-controlling piece of the dimension will be set as a first flow-controlling piece 110a, the second largest flow-control ling piece will be set as a second flow-controlling piece 110b, and the smallest flow-controlling piece will be set as a third flow-controlling piece 110c.

For example, when the pressure is the same, because the exerted force increases with an increase in the applied area of the pressure increases, the force exerted to the largest first flow-controlling piece 110a is the largest, and the largest first flow-controlling piece 110a can be titled at the largest angle accordingly. On the contrary, because the force exerted to the smallest third-controlling piece 110c is the smallest, the third flow-controlling piece 110c can be tilted at the smallest angle. That is, the tilting angle may be in the order of the first flow-controlling piece 110a, the second flow-controlling piece 110b, and the third flow-controlling piece 110c.

Thus, the degree of opening, of the fluid through-hole 120 can be sequentially controlled in accordance with the dimension of the flow-controlling piece 110. Thus, there is no great difference between the flow rates that pass through the respective fluid through-holes 120.

As described above, since the dimensions of the plurality of flow-controlling pieces 110 are formed to be different from each other, and the degree of opening of the fluid through-holes 120 is successively narrowed in accordance with the magnitude of the flow-controlling piece 110, it is possible to prevent all the flow-controlling pieces 110 from being subjected to the same force, and to prevent all the fluid through-holes 120 from being closed at the same time.

Because the degree of opening of the fluid through-hole 120 is controlled by changes in the flow rate or flow velocity of the fluid flowing through the flow channel 10 as described above, it is possible to improve the water-saving force for discharging an appropriate amount of flow rate.

Further, when a plurality of fluid through-holes 120 and a plurality of flow-controlling pieces 110 are formed, the fluid through-holes 120 and the flow-controlling pieces 110 can be placed on a concentric circle around the center of the plate 100. Since the force applied no the plate 100 is uniformly distributed rather than being concentrated on one side, a structural stability can be provided.

Further, at one side of the plate 100, a bypass flow passage 130 for preventing the flow of fluid from being interrupted may be formed.

When the elasticity of the flow-controlling piece 110 is lowered over time and the inclination formed by the plate 100 and the flow-controlling piece 110 decreases, the degree of opening of the fluid through-hole 120 is narrowed, and the flow rate of the fluid to be discharged to the outside may decrease. Alternatively, when the flow-controlling piece 110 becomes parallel to the plate 100, and the fluid does not properly pass through the flow-controlling piece 110, a failure of the water supply device 10 may be caused. Accordingly, since the bypass flow passage 130 through which the fluid can always pass is formed, it is possible to prevent the flow of fluid from being interrupted.

Further, a stopper 300 for limiting the tilting angle of the flow-controlling piece 110 may be provided at the rear of the plate 100. When very strong pressure suddenly acts on the flow-controlling piece 110, there is a possibility that the flow-controlling piece 110 may be tilted at an angle greater than the inclination formed between the flow-controlling piece 110 and the plate 100. Therefore, the stopper 300 may be provided at the rear of the plate 100 in order to prevent this problem., A mesh is applied to a portion of the stopper 300 corresponding to the flow through-hole 120 such that, only the fluid passes but the tilting angle of the flow-controlling piece 110 is limited, and the stopper 300 may be a pin provided to intersect with the fluid through-hole 120.

The stopper 300 is not 1 invited to the aforementioned configuration, and as long as it is possible limit the tilting angle of the flow-controlling piece 110, while allowing the normal flow of the fluid, anything can be adopted.

A plurality of flow-controlling units provided on the flow channel of the aforementioned embodiment of the present invention may be provided over the flow channel 10a to enhance the effect of constant flow rate.

Also, the flow-controlling unit provided on the flow channel of the present embodiment can also be directly installed in the flow channels 10a.

Figure 6:
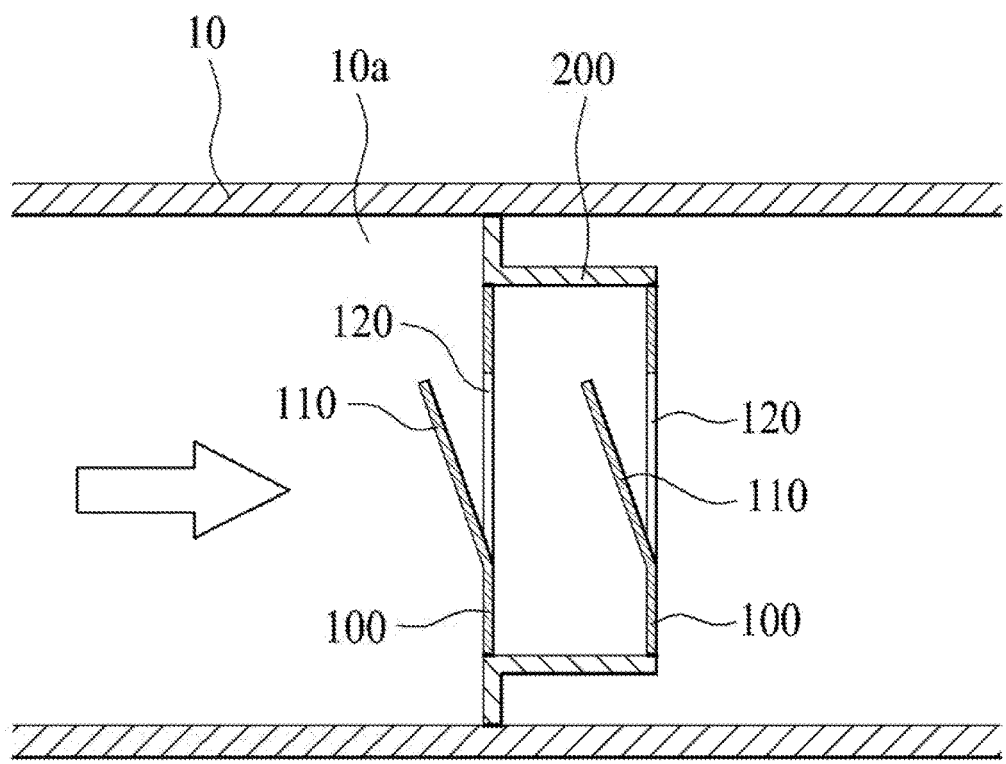
FIG. 6 is a diagram illustrating a configuration in which the flow-controlling unit provided on the flow channel according to an embodiment of the present invention is installed on the flow channel by an adapter.

FIG. 6 is a diagram illustrating a configuration in which the flow-controlling unit provided on the flow channel according to an embodiment of the present invention is installed in the interior of the flow channel of the water supply device by the adapter.

As illustrated in FIG. 6, an adapter 200 for installing a flow-controlling unit provided on the flow channel may be separately provided in the flow channel 10a on the inner side of the water supply device 10.

Figure 7:
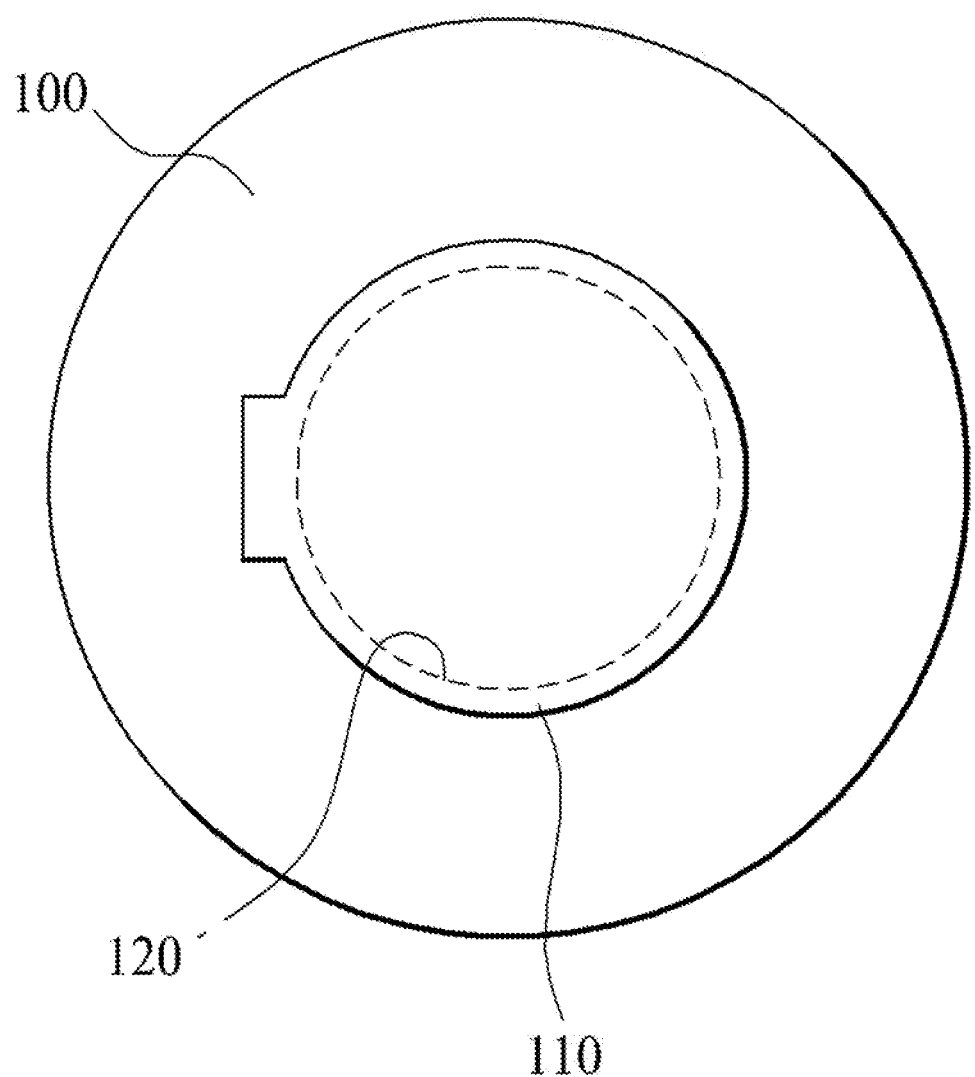
FIG. 7 is a plan view of the flow-controlling unit provided on the flow channel according to an embodiment of the present invention.
Figure 8:
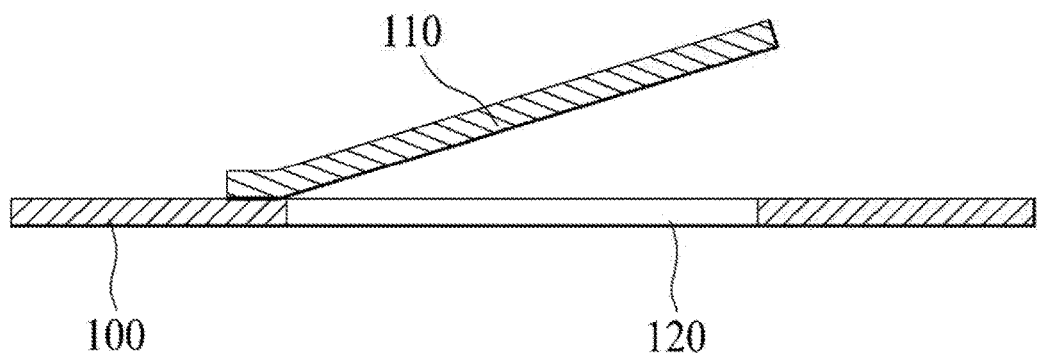
FIG. 8 is a cross-sectional view of the flow-controlling unit provided on the flow channel according to an embodiment of the present invention.

FIG. 7 is a plan view illustrating a configuration in which the flow-controlling piece of the flow-controlling unit provided on the flow channel according to an embodiment of the present invention is provided separately from the plate, and FIG. 8 is a cross-sectional view illustrating a configuration in which the flow-controlling piece of the flow-controlling unit provided on the flow channel according to an embodiment of the present invention is provided separately from the plate.

As illustrated in FIGS. 7 and 8, the flow-controlling piece of the present embodiment 110 can also be coupled to the plate 100 as a separate member.

The flow-controlling piece 110 may be joined to the plate 100 by welding. Even when the flow-controlling piece 110 is provided as a separate member, the flow-controlling piece 110 can form a predetermined inclination with the plate 100. Further, the flow-controlling piece 110 is tilted to the side that comes closer to the plate 100 when being pressurized by the hydraulic pressure, and the degree of opening of the fluid through-hole 120 becomes narrower. Further, when the hydraulic pressure applied to the flow-controlling piece 110 is removed, the flow-controlling piece 110 can be restored to the original state again.

Although an example in which the flow-controlling piece 110 is merely joined to the plate 100 toy welding or the like is illustrated in the drawings, a coupling method of the flow-controlling piece 110 and the plate 100 is not limited illustrated in the drawings.

For example, although not illustrated in the drawings, the flow-controlling piece 110 may also be rotatably hinged by a rotating shaft. When the flow-controlling piece 110 is hinged by the rotating shaft, a torsion spring may be provided in order to provide an elastic force and a restoring force to the flow-controlling piece 110.

When the flow-controlling piece 110 and the fluid through-hole 120 are integrally formed by partially cutting and bending the plate 100, since the dimension of the flow-controlling piece 110 cannot be formed to be larger than the dimension of the fluid through-hole 120, a separate stopper 300 is provided. However, when a separate flow-controlling piece 110 is coupled to the plate 100 with the fluid through-hole 120, there is no limit in the dimension of the flow-controlling piece 110.

Accordingly, by forming the dimension of the flow-controlling piece 110 to be greater than the dimension of the fluid through-hole 120 such that the flow-controlling piece 110 is supported by the plate 100 around the fluid through-hole 120, the tilting angle of the flow-controlling piece 110 can foe limited.

Hereinafter, a flow-controlling unit according to another embodiment of the present invention will be described with reference to FIGS. 9 and 10.

Figure 9:
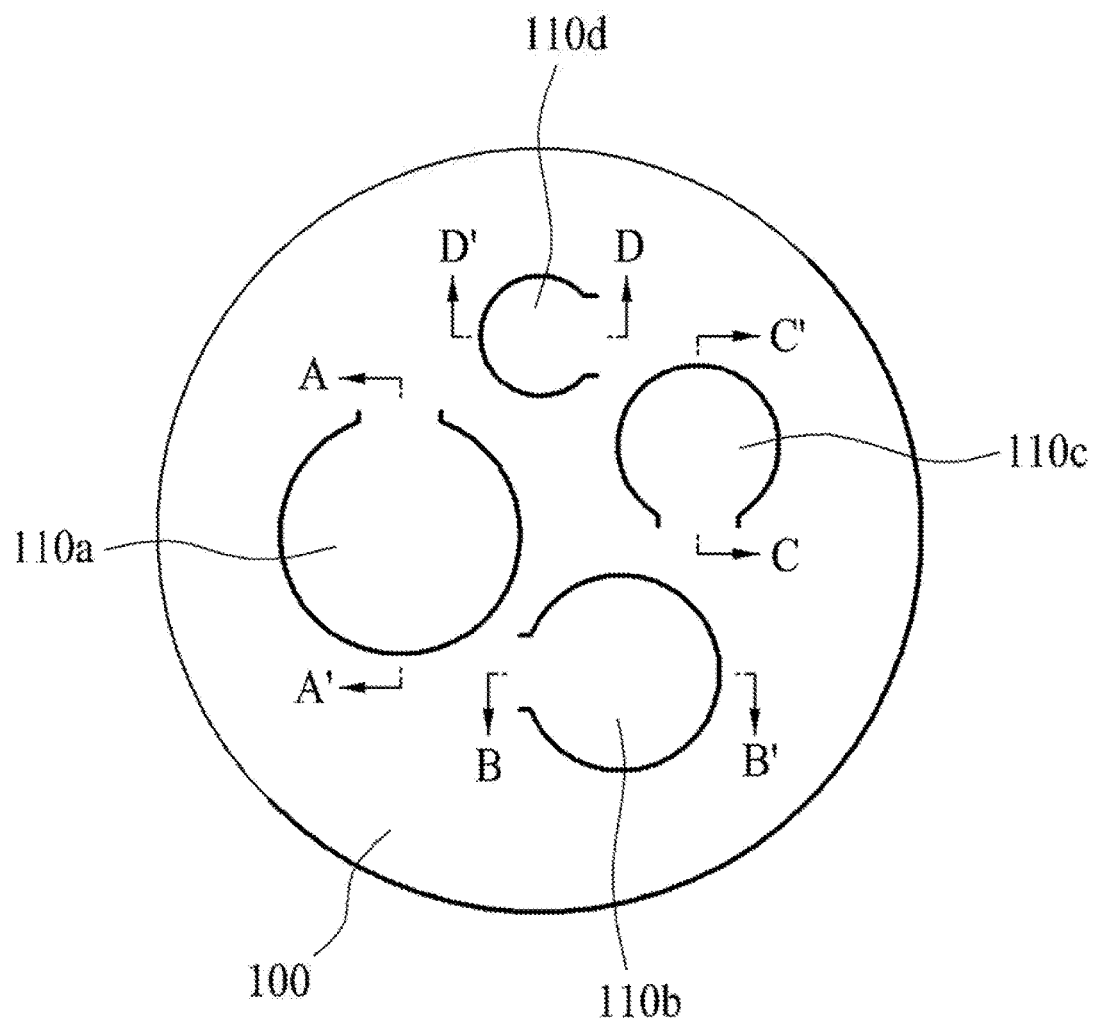
FIG. 9 is a plan view of the flow-controlling unit provided on the flow channel according to another embodiment of the present invention.
Figure 10:
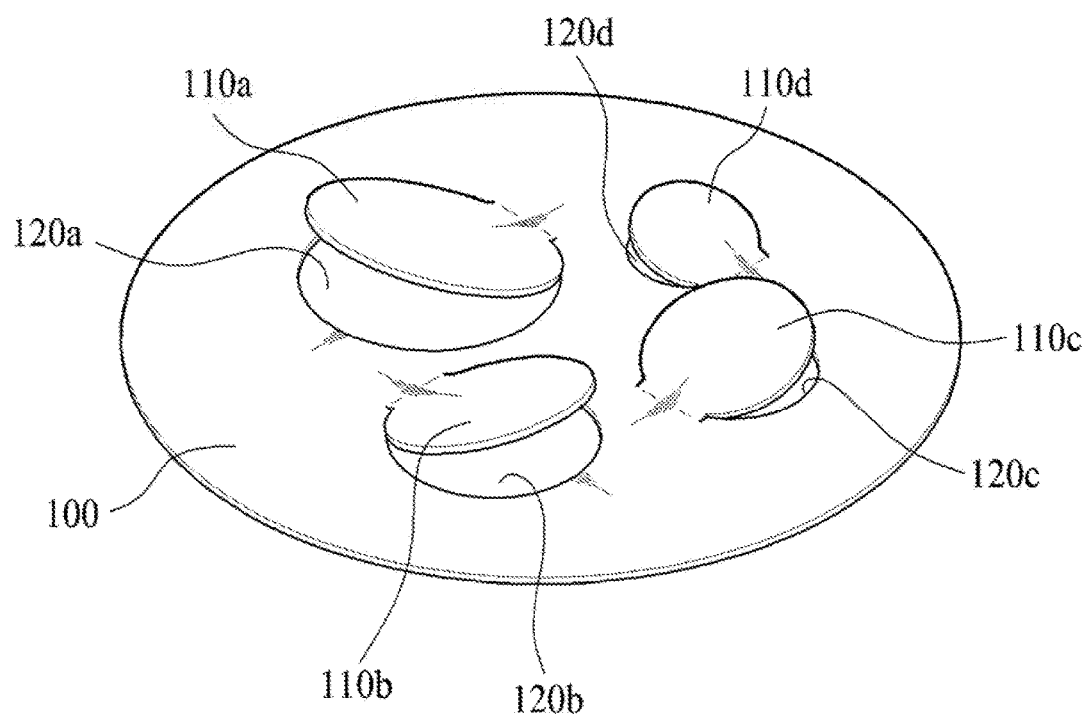
FIG. 10 is a perspective view of the flow-controlling unit provided on the flow channel according to another embodiment of the present invention.

FIG. 9 is a plan view of the flow-controlling unit provided on the flow channel according to another embodiment of the present invention, and FIG. 10 is a perspective view of the flow-controlling unit provided on the flow channel according to another embodiment of the present invention.

As illustrated in FIGS. 9 and 10, the flow-controlling unit according to another embodiment of the present invention includes a plate 100, and a flow-controlling piece 110.

Since the plate 100 of this embodiment is the same as the embodiment of the present invention, the description thereof will not be provided.

However, the flow-controlling piece 110 of the present embodiment can foe provided at a position corresponding to the fluid through-hole. Further, the flow-controlling piece 110 is provided to be tiltable with respect to the plate 100, while forming an inclination with the plate 100 in the inflow direction of the fluid, and at least two of a plurality of flow-controlling pieces no may be formed so that projected areas on which the hydraulic pressure acts are different from each other.

Here, the projected areas refer to the areas of the shadow that occurs on the back plane when projecting the parallel rays to an object, and the projected areas of the flow-controlling piece 110 in this embodiment may perpendicular to the movement direction of the fluid.

In the present embodiment, the areas of the plurality of flow-controlling pieces 110 may be formed to be different from each other. Accordingly, since the projected areas of the fluid flowing in the flow channel 10a are different from each other, each flow-controlling piece 110 can be tilted at different angles from each other.

In the present embodiment, an example in which the flow-controlling unit having a plurality of flow-controlling pieces with different projected areas includes the four flow-controlling pieces 110 will be described.

As illustrated in FIGS. 9 and 10, the four flow-controlling pieces 110 may be cut so that rotation axes of the flow-controlling pieces 110 are disposed to be perpendicular to each other, and the areas of the four flow-controlling pieces 110 can be formed to be smaller toward the counterclockwise direction.

For the convenience of the explanation, the flow-controlling piece with the largest area is set as a first flow-controlling piece 110a, and as the area becomes smaller, a second flow-controlling piece 110b, a third flow-controlling piece 110c, and a fourth flow-controlling piece 110d will be set in an ascending order. The fluid through-hole 120 formed by the first flow-controlling piece 110a will be referred to as a first fluid through-hole 120a, and the remaining fluid through-holes 120 are also referred to in an ascending order.

Figure 11:
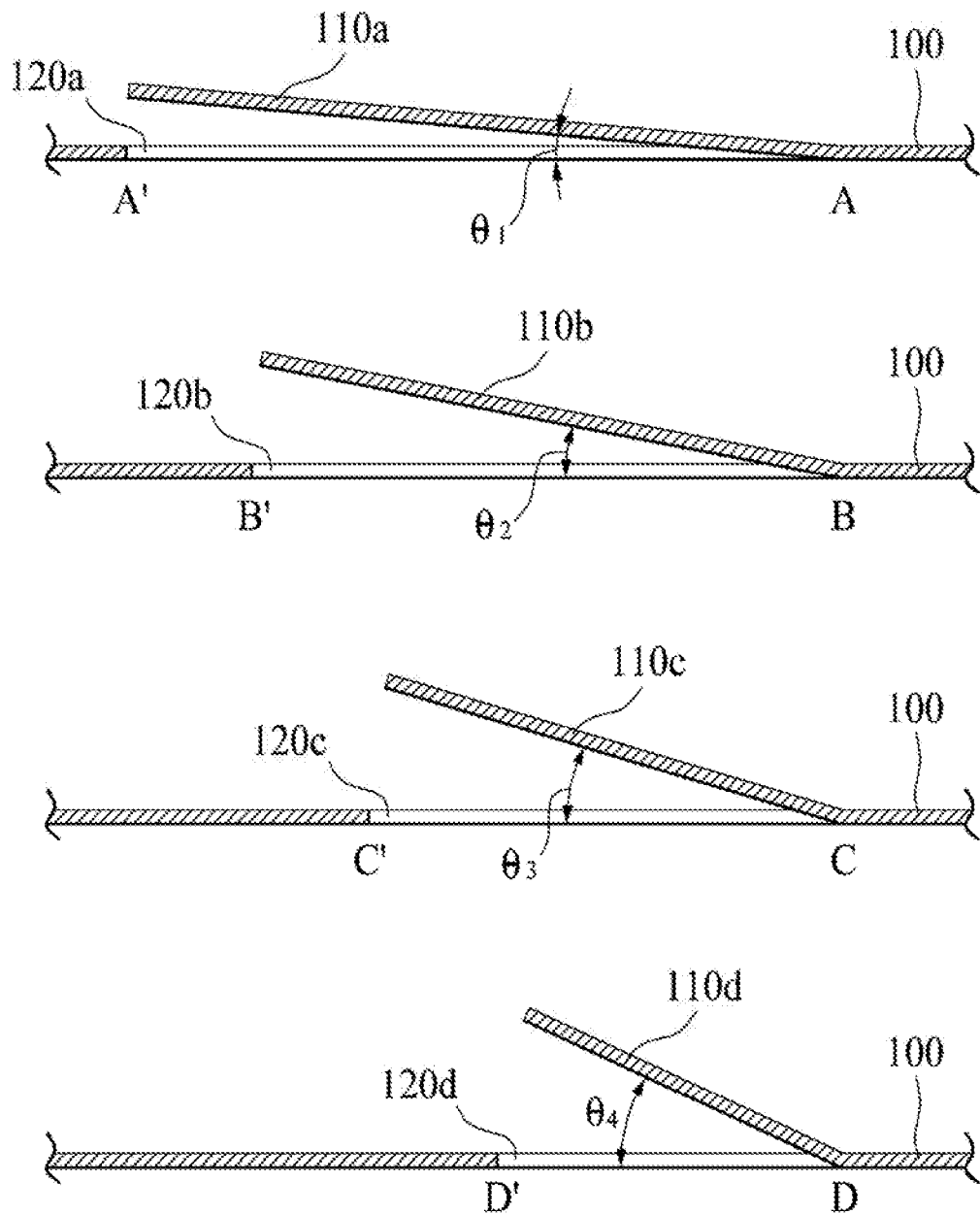
FIG. 11 is a cross-sectional view of each flow-controlling piece, when hydraulic pressure acts on each flow-controlling unit provided on the flow channel according to another embodiment of the present invention.

FIG. 11 is a cross-sectional view of the respective flow-controlling pieces when the hydraulic pressure acts on the flow-controlling unit having the plurality of flow-controlling pieces having the different projected areas according to another embodiment of the present invention.

For example, as illustrated in FIG. 11, when the pressure is the same, the exerted force may increase with an increase in the projected area on which the pressure acts. Further, when the inclination with the plate is the same, the projected area may also increase with an increase in the area of the flow-controlling piece.

Accordingly, the force exerted to the first flow-controlling piece 110a with the largest projected area is the largest, and thus, the first flow-controlling piece 110a is inclined at the largest angle. On the contrary, since the force exerted to the fourth flow-controlling piece 110d with the smallest projected area is the smallest, the fourth flow-controlling piece 110d can be inclined at the smallest angle.

That is, when the angle formed between the first flow-controlling piece 110a and the plate 100 is set as $\theta_1$, the angle formed between the second flow-controlling piece 110b and the plate 100 is set as $\theta_2$, the angle formed between the third flow-controlling piece 110c and the plate 100 is set as $\theta_3$, and the angle formed between the fourth flow-controlling piece 110d and the plate 100 is set as $\theta_4$, the relation of $\theta_1 < \theta_2 < \theta_3 < \theta_4$ may be obtained.

Thus, the degree of opening of the first fluid through-hole 120a is maximally reduced, and the flow rate passing through the first fluid through-hole 120a can be maximally reduced. Further, the degree of opening of the fourth fluid through-hole 120d minimally decreases, and there is no great difference in the flow rate passing through the fourth fluid through-hole 120d.

As described above, the areas of the plurality of flow-controlling pieces 110 are formed to be different from each, and the degree of openings of the fluid through-holes 120 are sequentially narrowed in accordance with the area of the flow-controlling piece 110. Thus, it is possible to prevent a situation in which all the flow-controlling pieces 110 are subjected to the same force, and all the fluid through-holes 120 are closed at the same time.

Since the degree of opening of the fluid through-hole 120 is controlled stepwise by change in the flow rate or flow velocity of the fluid flowing through the interior of the flow channel 10a as described above, it is possible to reduce the variation width of the flow rate to be discharged to the outside, thereby improving the water-saving force.

While, an example in which the four flow-controlling pieces 110 are cut to open in the direction perpendicular to each other has been described, although it is not illustrated in the drawings, the flow-controlling piece 110 can be cut so that the fluid through-hole 120 is opened toward the radially outward direction of the plate 100.

Alternatively, the flow-controlling piece 110 can also be cut so that the fluid through-hole 120 is opened toward the radially inward direction of the plate 100.

While en example in which the area, of the flow-controlling piece 110 becomes smaller toward the counterclockwise direction has been described, the area of the flow-controlling piece 110 is not limited thereto, and the area may vary depending on the manufacturing convenience or the flow channel to which the flow-controlling unit having a plurality of flow-controlling pieces with different projected areas of the present embodiment is applied.

Alternatively, the four flow-controlling pieces 110 can be disposed in four directions, such that the first flow-controlling piece 110a and the second flow-controlling piece 110b are disposed to face each other, and the third flow-controlling piece 110c and the fourth flow-controlling piece 110d are disposed to face each other at the remaining positions. Thus, for example, since the flow-controlling piece no is tilted in the order of the cross such as left, right, top and bottom, it is possible to prevent, the hydraulic pressure from being biased to one side of the plate 100.

Alternatively, the four or more even number of flow-controlling pieces 110 are provided in the plate 100, and the areas of the flow-controlling pieces 110 facing each other can be formed to be equal to each other.

For example, the areas of the first flow-controlling piece 110a and the second flow-controlling piece 110b are formed to be equal to each other such that the first flow-controlling piece 110a and the second flow-controlling piece 110b are disposed to face each other, and the areas of the third flow-controlling piece 110c and the fourth flow-controlling piece 110d are formed to be equal to each other such that the third flow-controlling piece 110c and the fourth flow-controlling piece 110d are disposed to face each other.

Accordingly, because the hydraulic pressure acting on the flow-controlling pieces 110 facing each other is the same and the closing velocity is the same, the hydraulic pressure acting on either side of the plate 100 is the same, and it is possible to prevent the flow rate and the hydraulic pressure from being concentrated on one side of the plate 100. Thus, it is possible to prevent the deformation, the damage or the like of the plate 100.

Alternatively, since the flow velocity and the flow rate are generally concentrated in the central part of the flow channel 10a due to the pipe line loss or the like, one flow-controlling piece 110 is disposed in the central part, and the remaining flow-controlling pieces 110 can foe disposed in the four directions of the flow-controlling piece 110 disposed in the central part.

Since the flow-controlling piece 110 is disposed in the central part, the pressure of the central part in which the flow velocity and the flow rate are concentrated are lowered, and the deformation and detachment of the plate 100 can be prevented accordingly.

Hereinafter, a flow-controlling unit according to another embodiment of the present invention will be described with reference to FIGS. 12 to 14.

Figure 12:
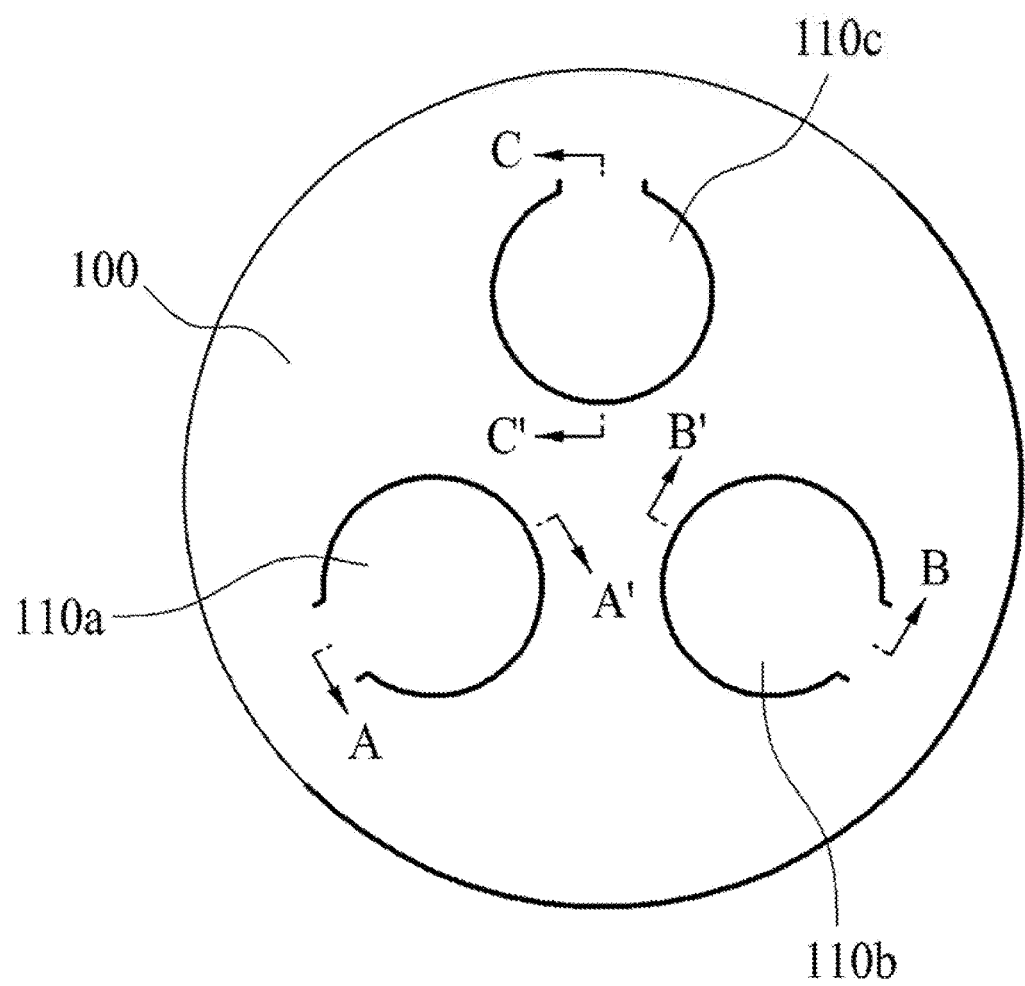
FIG. 12 is a plan view of the flow-controlling unit provided on the flow channel according to another embodiment of the present invention.
Figure 13:
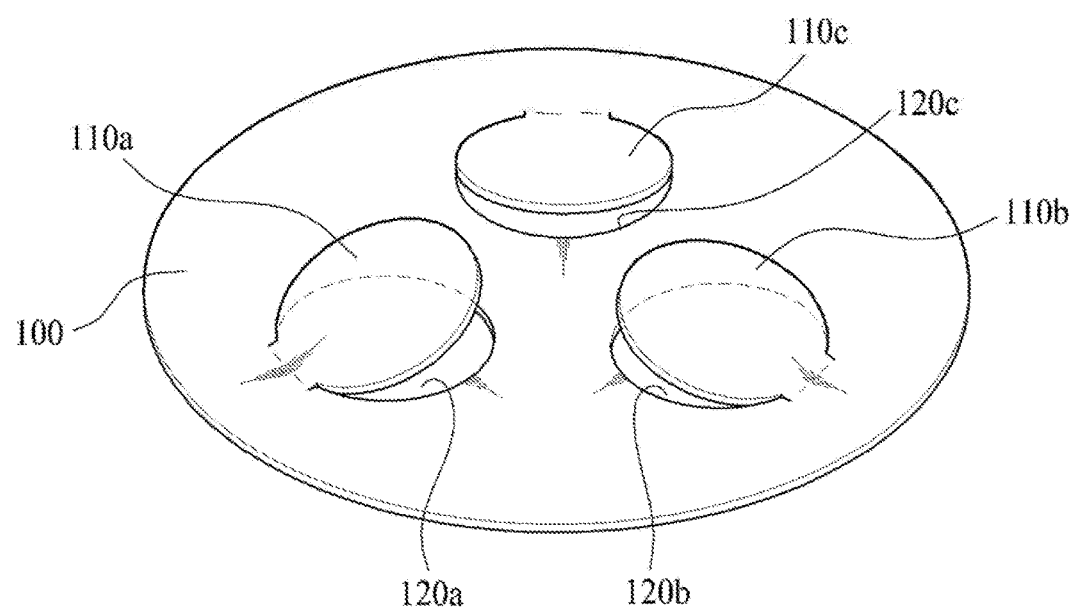
FIG. 13 is a perspective view of the flow-controlling unit provided on the flow channel according to another embodiment of the present invention.
Figure 14:
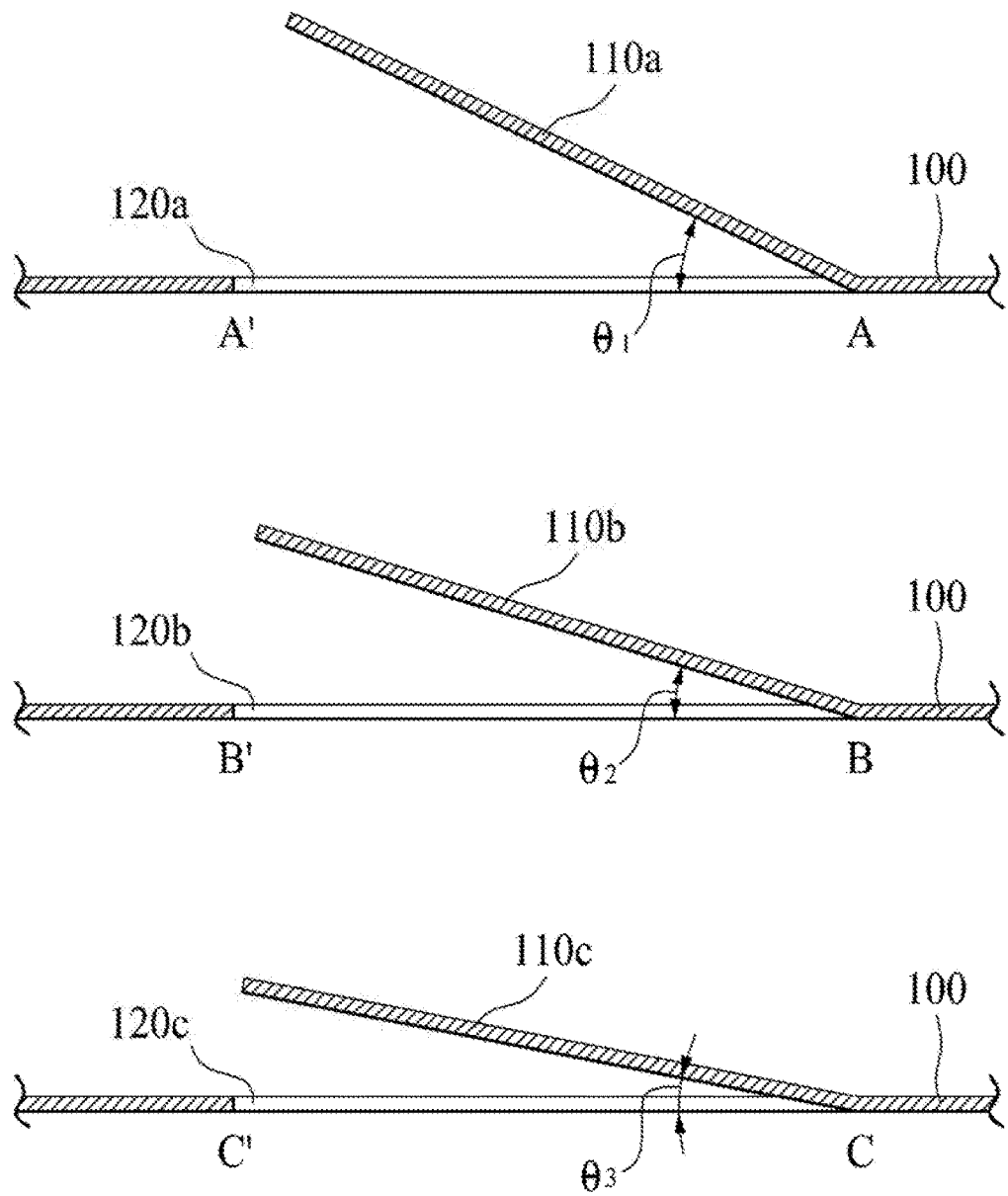
FIG. 14 is a cross-sectional view of the flow-controlling unit provided on the flow channel according to another embodiment of the present invention.

FIG. 12 is a plan view of a flow-controlling unit provided on a flow channel according to still another embodiment of the present invention, FIG. 13 is a perspective view of the flow-controlling unit provided on the flow channel according to still another embodiment of the present invention, and FIG. 14 is a cross-sectional view of the flow-controlling unit provided on the flow channel according to still another embodiment of the present invention.

The flow-controlling unit according to still another embodiment of the present invention includes a plate 100 and a flow-controlling piece 110.

Because the plate 100 in this embodiment is the same as the embodiment of the present invention, the description thereof will not be provided.

However, as illustrated in FIGS. 12 to 14, the inclinations formed between a plurality of flow-controlling pieces 110 of the present, embodiment and the plate 100 may be differently formed. Thus, the degree of opening can be sequentially narrowed from the fluid through-hole 120 corresponding to the flow-controlling piece 110 forming the small inclination with the plate 100, i.e., having the small projected area.

Here, the projected area refers to the area of the shadow that occurs on the back plane, when projecting the parallel rays to the object, and the projected area of the flow-controlling piece 110 in this embodiment can foe perpendicular to the movement direction of the fluid.

In this embodiment, an example in which the flow-controlling unit equipped with a plurality of flow-controlling pieces with different inclinations includes three flow-controlling pieces 110 and three fluid through-holes 120.

For convenience of explanation, a flow-controlling piece forming the largest inclination with the plate 100 is referred to as a first flow-controlling piece 110a, and as the inclination with the plate 100 becomes smaller, a second flow-controlling piece 110c and a third flow-controlling piece 110b will be referred in an ascending order. That is, as the angle with the plate 100 becomes larger, the inclination also becomes larger. Thus, an angle formed between the first flow-controlling piece 110a and the plate 100 is set as an angle formed between the second flow-controlling piece 110b and the plate 100 is set as $\theta_2$, an angle formed between the third flow-controlling piece 110c and the plate 100 is set as $\theta_3$, the relation of $\theta_1 > \theta_2 > \theta_3$ may be obtained.

Further, the fluid through-holes corresponding thereto will be referred to as a first fluid through-hole 120a, a second fluid through-hole 120b and a third fluid through-hole 120c, respectively.

If the pressure is the same, as the projected area becomes larger, the force acting on the flow-controlling piece 110 becomes larger, and when the areas of each flow-controlling piece 110 are the same, as the angle with the plate 100 becomes smaller, the projected area is large. Thus, the force exerted on the third flow-controlling piece 110c forming the smallest inclination with the plate 100 is the largest, and the third flow-controlling piece 110c can be tilted at the largest angle accordingly. On the contrary, since the force exerted on, the first flow-controlling piece 110a forming the largest inclination with the plate 100 is the smallest, the first flow-controlling piece 110a can be tilted at the smallest angle.

As described above, the inclinations formed between the plate 100 and the plurality of flow-controlling pieces 110 are formed to be different from each other, and the degree of openings of the fluid through-holes 120 are sequentially narrowed according to the inclination. Thus, it is possible to prevent all the flow-controlling pieces 110 from being subjected to the same force, and all the fluid through-holes 120 from being closed at the same time.

As described above, since the degree of opening of the fluid through-hole 120 is controlled in a stepwise manner by a change in flow rate or flow velocity of the fluid flowing through the interior of the flow channel 10a as described above, it is possible to improve the water-saving force by discharging an appropriate amount of flow.

In the present embodiment, while an example in which all the areas of the fluid through-holes 110 are formed to be equal to each other has been described, the areas of the fluid through-holes 110 may also be formed to be different from each other.

Alternatively, while an example in which the three flow-controlling pieces 110 are formed has been described in the drawings, when an even number of flow-controlling pieces 110 is formed, the inclination formed between the flow-controlling pieces 110 opposed to each other and the plate 100 can be equally formed.

Accordingly, since the hydraulic pressure acting on the flow-controlling pieces 110 facing each other is the same and the closing velocity is the same, it is possible to prevent a problem in which the same hydraulic pressure acts on either side of the plate 100, and the flow rate and the hydraulic pressure are concentrated on one side of the plate 100. Thus, it is possible to prevent the deformation, damage or the like of the plate 100.

While the preferred embodiments according to the present invention have been described, it will be obvious to those of ordinary skill in the art that the present invention can be embodied in other specific forms without depart from its spirit or categories, in addition to the previously described embodiments. Accordingly, the aforementioned embodiments should be considered as being illustrative rather than being restrictive, and the present invention may be varied within the category of the appended claims and their equivalents, without being limited to the foregoing description, accordingly.

The invention claimed is:

1. A flow-controlling unit comprising:
   a plate which is disposed to be perpendicular to a movement direction of a fluid in a flow channel, and on which one or more fluid through-holes through which the fluid passes are formed; and
   one or more flow-controlling pieces, which are provided at a position corresponding to the fluid through-holes, form an inclination with the plate in the movement direction of an inflow of the fluid, are capable of tilting with respect to the plate, and control a degree of opening of the fluid through-holes by being tilted while being pressed by hydraulic pressure of the fluid, wherein a bypass flow channel spaced from the one or more fluid through-holes and configured to prevent the flow of the fluid from being interrupted is formed in a center of the plate.

2. The flow-controlling unit of claim 1, wherein the one or more flow-controlling pieces form the one or more fluid through-holes, by being partially cut from the plate and bent to an inflow-side of the fluid to form the inclination with the plate.

3. The flow-controlling unit of claim 1, wherein the one or more fluid through-holes and the one or more flow-controlling pieces are formed, the fluid through-holes and the flow-controlling pieces are disposed on a concentric circle around a center of the plate.

4. The flow-control ling unit of claim 1, wherein the one or more flow-controlling pieces have an elastic force and a restoring force so that the one or more flow-controlling pieces can be restored to its original state when the hydraulic pressure is removed.

5. The flow-controlling unit of claim 1, wherein when the one or more fluid through-holes and the one or more flow-controlling pieces are formed, at least two of the one or more flow-controlling pieces are formed such that projected areas on which the hydraulic pressure acts are different from each other, and by being tilted while being pressed due to the hydraulic pressure of the fluid, the degrees of opening of the one or more fluid through-holes are sequentially narrowed in accordance with the areas of the one or more flow-controlling pieces.

6. The flow-controlling unit of claim 1, wherein when the the one or more fluid through-holes and the one or more flow-controlling pieces are formed, the inclinations of at least two of the one or more flow-controlling pieces with the plate are formed to be different from each other, and by being tilted while being pressed due to the hydraulic pressure of the fluid, the degrees of opening of the fluid through-holes are sequentially narrowed in accordance with the inclinations of the one or more flow-controlling pieces.

7. The flow-controlling unit of claim 1, wherein a dimension of-the one or more flow-controlling pieces corresponds to a dimension of the respective one or more fluid through-holes.

* * * * *